(12) United States Patent
Roeder

(10) Patent No.: US 6,660,922 B1
(45) Date of Patent: Dec. 9, 2003

(54) SYSTEM AND METHOD FOR CREATING, REVISING AND PROVIDING A MUSIC LESSON OVER A COMMUNICATIONS NETWORK

(76) Inventor: Steve Roeder, 7706 139th Pl. NE, Redmond, WA (US) 98052

( * ) Notice: Subject to any disclaimer, the term of this patent is extended or adjusted under 35 U.S.C. 154(b) by 0 days.

(21) Appl. No.: 10/077,099

(22) Filed: Feb. 15, 2002

Related U.S. Application Data

(60) Provisional application No. 60/269,602, filed on Feb. 15, 2001.

(51) Int. Cl.[7] ............................................. G09B 15/00
(52) U.S. Cl. ...................... 84/477 R; 84/470 R; 84/609
(58) Field of Search .......................... 84/609–614, 645, 84/470 R, 477 R, 478; 434/307 R, 307 A, 350–352

(56) References Cited

U.S. PATENT DOCUMENTS

| | | | |
|---|---|---|---|
| 5,690,496 A | | 11/1997 | Kennedy ................ 434/307 R |
| 5,925,843 A | * | 7/1999 | Miller et al. ................ 84/609 |
| 6,084,168 A | * | 7/2000 | Sitrick ...................... 84/477 R |
| 6,348,648 B1 | * | 2/2002 | Connick ................... 84/477 R |
| 2001/0036620 A1 | | 11/2001 | Peer et al. ............. 434/307 R |
| 2002/0004191 A1 | | 1/2002 | Tice et al. ................. 434/350 |

* cited by examiner

Primary Examiner—Marlon T. Fletcher
(74) Attorney, Agent, or Firm—Graybeal Jackson Haley LLP

(57) ABSTRACT

A system and method for creating, revising, archiving and providing a music lesson over a communications network comprises a teacher station controlled by a teacher, one or more student stations each controlled by a student and an administrative station connected to the teacher and student stations that facilitates the transfer of a lesson file over a communications network. The teacher station comprises a computer and a lesson creator/reviser program executable by the computer that can generate a lesson file representing the audio and visual content of a music lesson. The lesson creator/reviser program comprises various modules that receive the audio and/or visual lesson content and correspondingly generate sub-files that form the lesson file. More specifically, a syncedit module can generate an audio-notation sub-file by simultaneously receiving digital audio data and MIDI data representing a piece of music, generating dynamic visual display data of the music and allowing a teacher to quickly and easily revise the dynamic visual display data so that the lesson content can be provided to students in substantially real time. The student station comprises a computer and a lesson viewer program executable by the computer that includes an audio-notation viewer module to play and display the audio-notation sub-file such that the digital audio data and dynamic visual display data are in sync with each other to show the student the note or notes being played as the student hears the note or notes.

9 Claims, 8 Drawing Sheets

FIG. 6

SYSTEM AND METHOD FOR CREATING, REVISING AND PROVIDING A MUSIC LESSON OVER A COMMUNICATIONS NETWORK

CROSS-REFERENCE TO RELATED APPLICATIONS

This application claims priority from commonly owned U.S. Provisional Patent Application 60/269,602, titled METHOD AND SYSTEM FOR INTERACTIVE INSTRUMENT INSTRUCTION, filed Feb. 15, 2001, which is hereby incorporated by reference in its entirety.

BACKGROUND

Learning to play a musical instrument is a complex and challenging task. In addition to the physical coordination required to play the instrument, a student must learn to visualize in his/her mind the note or pattern of notes that comprise a piece of music he/she wants to hear, the note's or pattern of notes' representation on paper as a musical score and how the notes or pattern of notes are played on the instrument. Furthermore, music includes complex concepts, for example, melody, rhythm tempo and harmony. Consequently, most music lessons are conducted in person or with the student and teacher able to interact in real time so that the teacher can revise the lesson to focus on the part of the lesson the student finds difficult.

With a computer and a communications network, such as the Internet, a teacher can provide musical lessons to many students inexpensively. Although use of a computer and a communications network allows the teacher and student to interact in real or substantially real time, the software the teacher typically uses to create a digital file of the music lesson does not permit the teacher to quickly and easily revise and archive the visual and/or audio content of the lesson. Thus, when a student asks a question about improvising, a teacher's explanation of harmony and improvising in key is largely limited to explaining the concepts with a message in text, a spoken message, or a video of the teacher playing his/her musical instrument.

Thus there is a need for providing musical lessons over a communications network that allows the teacher to quickly and easily revise and archive the visual and/or audio content of the lesson in real or substantially real time and archive.

SUMMARY

The present invention provides systems and methods for creating, revising and providing a music lesson over a communications network. The system comprises a teacher station controlled by a teacher and one or more student stations each controlled by a student. These stations can be connected directly to each other over a communication network or they can each be connected to an administrative station that facilitates the transfer of a lesson file over a communications network. The teacher station comprises a computer and a lesson creator/reviser program that is executable by the computer and can generate a digital lesson file representing the audio and visual content of a music lesson. The lesson creator/reviser program comprises various modules that receive the audio and/or visual lesson content and correspondingly generate sub-files that form the lesson file. More specifically, the lesson creator/reviser program comprises a syncedit module that simultaneously receives digital audio data and MIDI data representing a note or notes played by the teacher with his/her instrument. From the MIDI data, the syncedit module generates dynamic visual display data of the note or notes and can play the digital audio data and display the dynamic visual display data in sync with each other. Furthermore, the syncedit allows the teacher to quickly and easily revise the visual display so that the teacher can more easily explain complex musical concepts in real or substantially real time.

The student station comprises a computer and a lesson viewer program that is executable by the computer and can display the audio and visual content represented by the digital lesson file created by the lesson creator/reviser program. The lesson viewer program comprises various modules that receive respective sub-files of the digital lesson file and play and/or display the lesson content represented by each sub-file. More specifically, the lesson viewer program comprises an audio-notation viewer module that can play the digital audio data and display the dynamic visual display data generated by the syncedit module in sync with each other to show the student the note or notes being played as the student hears the note or notes.

In one aspect of the invention, the syncedit module allows the teacher to overlay a scale of the key of the lesson content heard and dynamically displayed onto the dynamic visual display of the music. In addition, the syncedit module allows the teacher to visually indicate when music changes key and the key the music changed to. Other types of revisions the syncedit module can allow the teacher to make include visually representing a note as a circle with a number in it or as the note's name, for example, A, A#, C, C#; adding visual representations of additional notes to indicate an arpeggio; and selecting and/or deleting portions of the digital display data.

In another aspect of the invention, the syncedit module can generate a dynamic visual display in the form of tabulature notation, staff notation, an image of a virtual instrument, an image of the audio content on a time verses decibel scale or any combination of these. Furthermore, the audio-notation viewer module of the lesson viewer program can display the dynamic visual display data in the form of tabulature notation, staff notation, an image of a virtual instrument or any combination of these.

In still another aspect of the invention, the lesson creator/reviser program can include a tabedit module that can generate and revise a dynamic visual display in the same way the syncedit module does but can display the dynamic visual display using more than one line. Thus, lengthy pieces of music can be dynamically visually displayed for the benefit of the student.

BRIEF DESCRIPTION OF THE FIGURES

FIG. 6 shows a representative screen display of the lesson creator/reviser program in FIG. 3 displaying a lesson file according to an embodiment of the invention;

DETAILED DESCRIPTION

Figure 1:
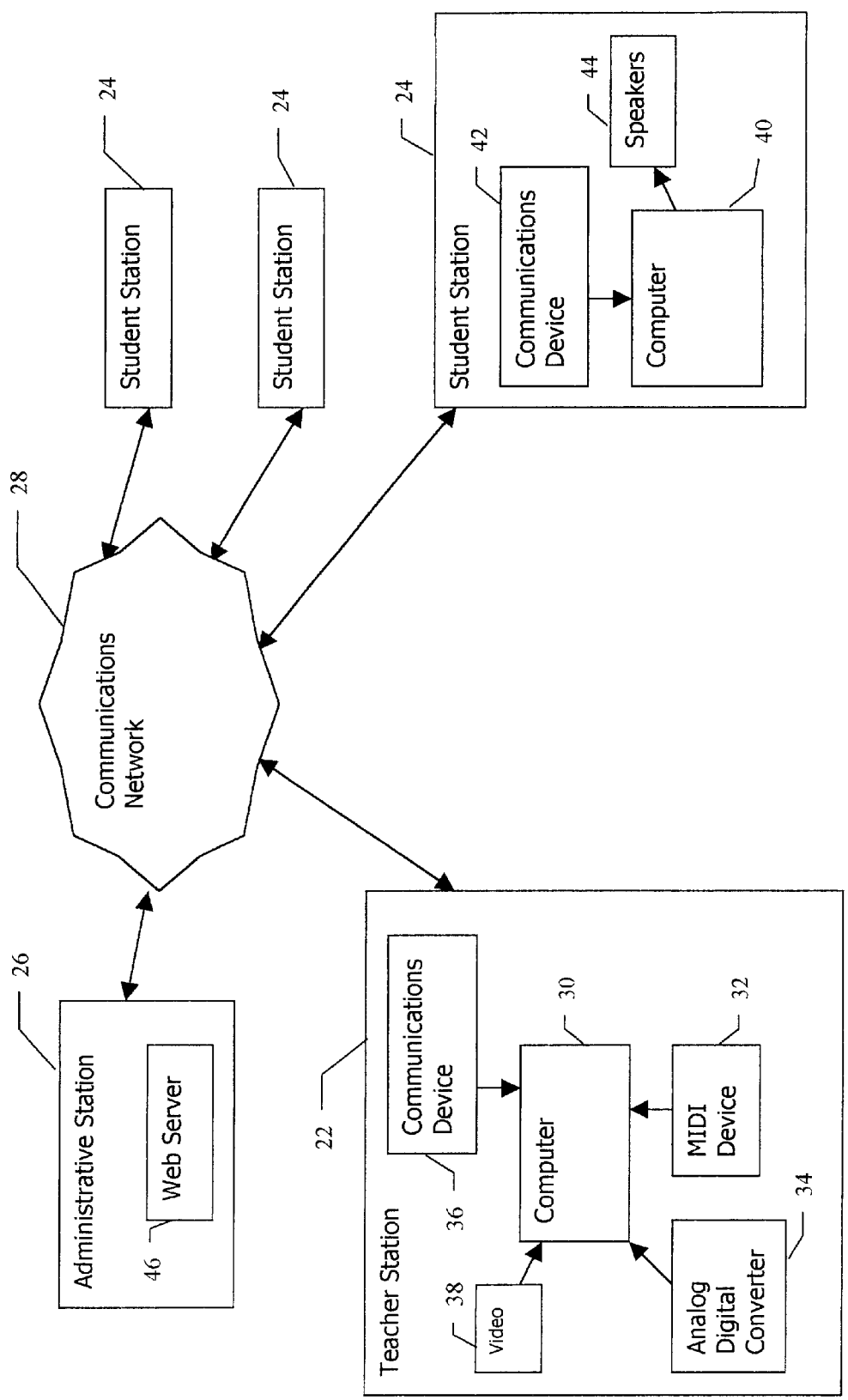
FIG. 1 is a schematic block diagram of a system according to an embodiment of the invention.

All terms used herein, including those specifically described below in this section, are used in accordance with their ordinary meanings unless the context or definition indicates otherwise. Also, unless indicated otherwise, except within the claims, the use of "or" includes "and" and vice-versa. Non-limiting terms are not to be construed as limiting unless expressly stated (for example, "including" and "comprising" mean "including without limitation" unless expressly stated otherwise).

The present invention provides a system for providing music lessons over a communications network. The system comprises two or more stations, a teacher station controlled by a teacher and one or more student stations each controlled by a student, that are connected to each other via a communications network. The teacher station comprises a teacher computer and a lesson creator/reviser program executable by the teacher computer, and the student station comprises a student computer and a lesson viewer program executable by the student computer. Audio and visual content of the music lessons are created by the teacher and digitally recorded as lesson files by the lesson creator/reviser program. To play the audio content and display the visual content of the lesson file, the one or more students download the lesson file and load the lesson file into the lesson viewer program.

With the lesson creator/reviser program, the teacher can provide the one or more students with an audio recording of a piece of music and a visual display of the piece of music that is dynamic and in sync with the audio recording and can be quickly and easily edited or revised to illustrate more complex musical concepts. More specifically, the display and audio recording can be respectively viewed and played in sync with each other such that as a student hears the notes of the audio recording, the student can see a dynamic visual representation of the same notes. Thus, the student can visually see the notes corresponding to the music he hears and can more easily develop his/her music reading skills and his/her mental association of notes he/she hears with notes he/she sees. That is, the student the can visualize the music he/she hears and hear the music he/she sees. Furthermore, the teacher can illustrate more complex musical concepts such as a scale of the key of the musical piece recorded or an arpeggio of a musical chord.

Consequently, with the system and lesson creator/reviser program a teacher can provide a music lesson in a number of ways. For example, the teacher can digitally record and save the whole music lesson on any removable storage media for shipment to a student or in a directory that can be subsequently accessed by one or more students and downloaded over the communications network. Or, with the ability to easily and quickly revise and archive the digital lesson file, the teacher can provide a music lesson in real time—minimal or no lag time between the time the teacher sends digital lesson content from his/her station and the time the student receives the content—with valuable real time interaction between the students and the teacher and archive the lesson for future use. For example, in response to a student's inquiry about improvisation, the teacher can add a visual display of the scale of the key of the piece of music to the visual display of the music. Or, the teacher can add audio content by improvising on his musical instrument, add the scale of the key of the music he just improvised to the visual display and then send this content to the student. The student can then see the musical concept of improvising within the key of the musical piece. Thus, a lesson conducted live over a communication network can be revised in real time to provide valuable live interaction between a student and teacher during a lesson and archived for future use.

Referring to FIG. 1, in this and certain other embodiments, a system 20 for providing music lessons over a communication network comprises a teacher station 22, a student station 24, and an administrative station 26 that communicate with each other via a communications network 28. In this embodiment, the teacher station 22 communicates with the administrative station 26 via a portion of the communications network 28 and the student station 24 communicates with the administrative station 26 via another portion of the communications network 28. Consequently, the teacher station 22 communicates with the student station 24 through the administrative station 26. This allows one teacher station 22 to provide a music lesson to many student stations 24 in real time while preserving system resources of the teacher station 22.

In other embodiments, the teacher station 22 may communicate directly with the student stations 24 or may not communicate with either station 24 or 26. For example, when the teacher station provides a music lesson to one or a few student stations in real time, the teacher station 22 may communicate directly with a student station 24. Or, when the teacher station provides a music lesson for subsequent sale to a student, the teacher station may archive the music lesson on any desired storage media such as a floppy disc, compact disc, magnetic tape, or removable hard drive for subsequent sale to a student.

Still referring to FIG. 1, the teacher station 22 comprises a lesson creator/reviser program executable by a teacher computer 30 that includes hardware components and corresponding software to allow the teacher to control the hardware. The operating system software can be any desired system software such as Windows 98, Windows 2000, O.S. 8.0 (Mac), or Linux, that can support the hardware and software used by the teacher to create the digital lesson file. In this and certain other embodiments, the operating system software is Windows 98 and the hardware components include a MIDI device 32, an audio analog digital converter 34, a communications device 36, a monitor for displaying the digital lesson file, an alpha-numeric keyboard for inputting text and editing the digital lesson file, speakers, and a mouse. The MIDI device 32 can be any desired MIDI device that generates digital data from a musical instrument using MIDI protocol. For example, the MIDI device can be a MIDI music keyboard or guitar or a MIDI converter attachable to a conventional music keyboard or guitar. The analog digital converter 34 can be any desired converter that can convert an analog signal generated by a musical instrument to digital data that can be used by the teacher computer 30. The communications device 36 can be any desired modem that can support the desired networking protocol. For example, the modem and corresponding software can support TCP/IP networking protocol used to communicate via the Internet or the modem and corresponding software can support other networking protocols such as Ethernet local area network protocol or conventional wireless network protocols.

Still referring to FIG. 1 in this and certain other embodiments, the teacher station can also include a video camera 38 connected to the teacher computer 30 to include in the digital lesson file a video of the teacher or some other performer playing a musical instrument. This may be desirable when a musical piece included in the digital lesson file requires a difficult or unobvious finger placement on the instrument.

Still referring to FIG. 1, the student station 24 comprises a lesson viewer program executable by a student computer 31 that includes hardware components and corresponding software to allow the student to control the hardware. The operating system software can be any desired software such as Windows 98, Windows 2000, OS 8.0 (Mac) or Linux, that can support the hardware and software used by the student to view the lesson file. In this and certain other embodiments, the operating system software is Windows 98 and includes an internet browser, Microsoft Explorer for example, that can be used in conjunction with the lesson viewer program to display the digital lesson file. The hardware components include a communications device 42 as discussed in conjunction with the teacher station 22, a monitor for displaying the digital lesson file and speakers for providing audio content of the digital lesson file, and a mouse.

Still referring to FIG. 1, the administrative station 26 comprises a web server 46 to facilitate the transfer of the digital lesson file between the teacher station 22 and the student station 24. In this and certain other embodiments, the web server 46 is a general web server that includes Windows NT operating system software with active server pages module (ASP). In other embodiments, the web server 46 can include any other operating system software as desired. In addition, the web server can include a database to archive the digital lesson file sent by the teacher. With the administrative station's ability to archive, a music lesson conducted in real time can be archived for future use by the teacher or student, or a music lesson recorded for future use can be easily accessed by students via the communications network 28.

Figure 2:
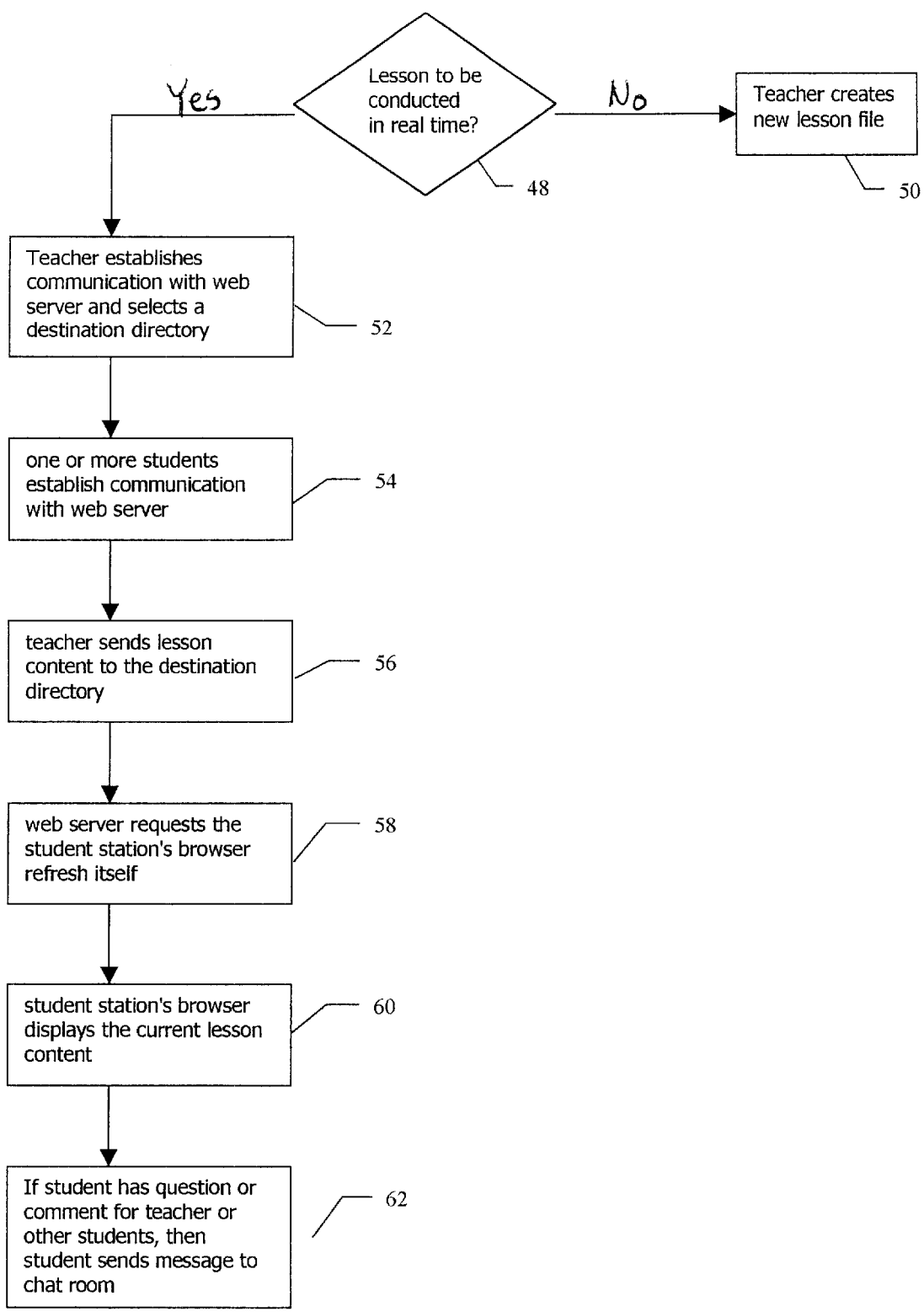
FIG. 2 shows a flowchart of a process of;providing a music lesson using the system in FIG. 1, according to an embodiment of the invention.

FIG. 2 shows a flowchart of a process of providing a music lesson using the system 20 of FIG. 1 according to an embodiment of the invention. In this and certain other embodiments, at step 48 the teacher first decides whether the lesson will be provided to the students in real time. If the lesson is not to be provided to students in real time then at step 50 the teacher creates a new digital lesson file or revises a previously created digital lesson file as discussed in greater detail elsewhere herein, and saves the created or revised digital lesson file in a destination directory. The destination directory may be located in the web server 46 of the administrative station 26 in FIG. 1 or on any desired storage medium, as discussed elsewhere herein, located in the teacher station 22, student station 24 or some other desired location. If the lesson is to be provided to students in real time, then at step 52 the teacher establishes communication with the web server 46 and selects a destination directory on the web server 46. Next, at step 54, one or more students establish communication with the web server. If, there is a lesson file in the destination directory then the student computer loads the lesson file. Next at step 56 the teacher sends lesson content to the destination directory. Then, at step 58, the web server 46 requests the student station's web browser refresh itself. At step 60, the student station's browser displays the current lesson content. After the web browser downloads the current lesson, the web server 46 returns to step 58 and waits for the teacher to update the digital lesson file by sending more content to the destination directory.

Still referring to FIG. 2, in this and certain other embodiments, a chat room located on the web server 46 can be used to allow questions and comments to be exchanged between the teacher and other students in real time. At step 62, the student can send a message in text to the chat room that communicates the student's message to the teacher, other students or both. The teacher or other students can then respond via the chat room. In other embodiments, communication can be established by any other desired method using a corresponding format. For example, the teacher and student can communicate with each other using conventional streaming video.

Figure 3:
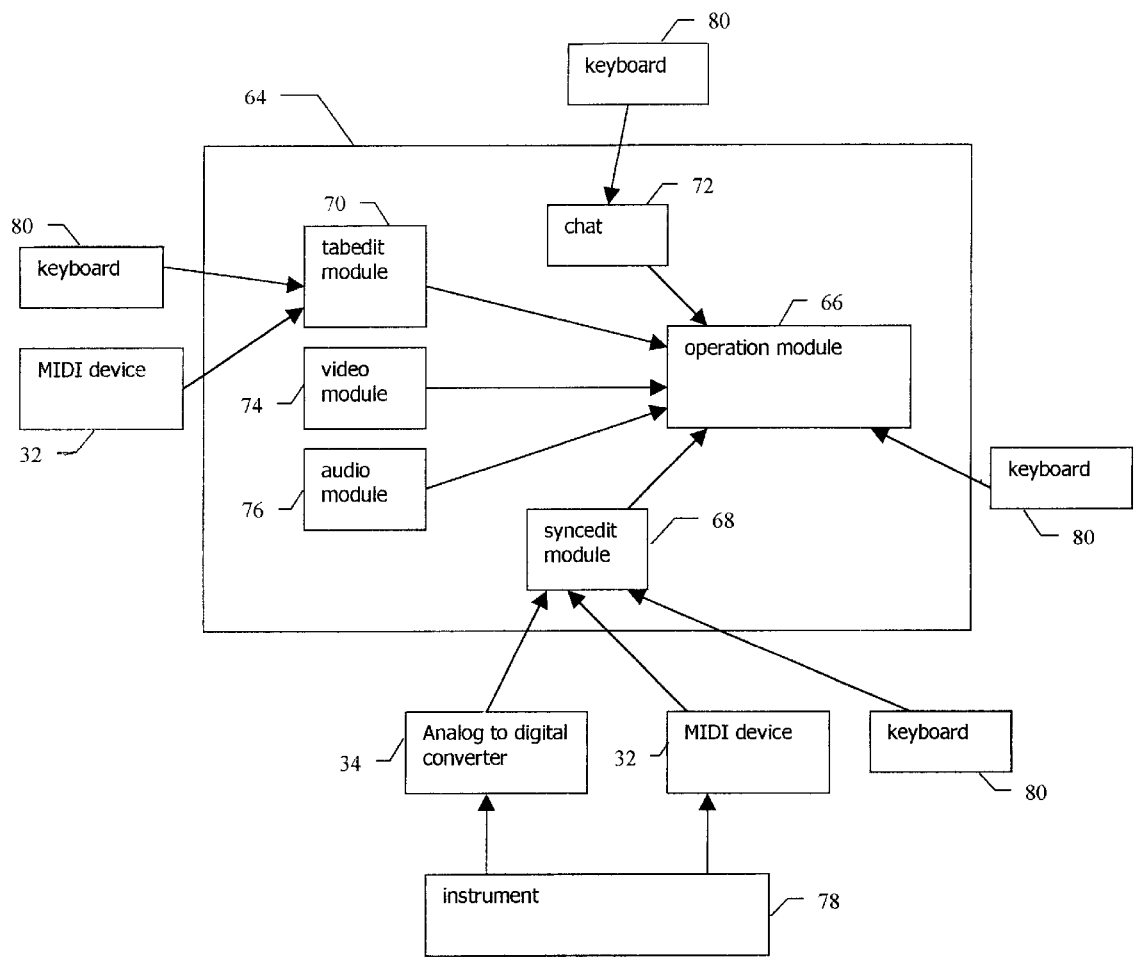
FIG. 3 shows a functional block diagram of a lesson creator/reviser program illustrating a relationship of various modules included in the lesson creator/reviser program, according to an embodiment of the invention.

FIG. 3 shows a functional block diagram illustrating a relationship of various modules that can be included in the lesson creator/reviser program 64 to allow a teacher to create or revise a digital lesson file according to an embodiment of the invention. In this and certain other embodiments, the lesson creator/reviser program 64 comprises an operation module 66, a syncedit module 68, a tabedit module 70, a chat module 72 and video and audio modules 74 and 76. When creating a music lesson, the teacher uses the operation module 66 in conjunction with one or more of the other modules to create or revise a digital lesson file.

In this and certain other embodiments, the syncedit module 68 generates an audio-notation sub-file that includes digital audio data representing the audio content of a lesson and digital display data representing the same audio content and used to dynamically visually display the audio content. The syncedit module 68 generates an audio-notation sub-file by first simultaneously receiving MIDI data generated by the MIDI device 32 and digital audio data generated by converting an analog signal from the instrument 78 with an analog to digital converter 34. Next, the syncedit module 68 generates the digital display data from the MIDI data. Because the syncedit module receives the MIDI data and digital audio data simultaneously from the instrument 78, the digital audio data and digital display data are in sync with each other. When the audio-notation sub-file is played back, the dynamic visual display of the audio content changes in sync with the changes in the note or chord heard. Thus, the student can more easily associate the visual representation of the note or chord he/she hears with the note's or chord's sound. Also, with the digital audio data and the digital display data in sync, any data derived from either type of data can be kept synchronous with the other type of data based on time that is not derived from the tempo of the music, and thus synchronization errors caused by the derivation process can be avoided.

Still referring to FIG. 3, the digital display data can be displayed on a monitor in any desired form. In this and certain other embodiments, the form of the display includes one or any combination of tabulature notation, staff notation, a virtual image of the instrument 78, and an image of the audio content on a time verses decibel scale. If tabulature notation is displayed then the tabulature notation appropriate for the musical instrument 78 is used. For example, if the music lesson involves the guitar then the tabulature notation displayed would be the notation appropriate for the guitar. If, however, a music lesson involves drums or some other desired instrument then the tabulature notation displayed would be the notation appropriate for the drum or the other desired instrument. If a virtual instrument is displayed, then the notes or chords can be represented by circles indicating finger placement on the instrument or represented in any other desired form.

Still referring to FIG. 3, in this and certain other embodiments, the syncedit module 68 also allows the teacher to edit or revise the digital display data of the audio-notation sub-file so that the teacher can communicate more complicated musical concepts in conjunction with the audio content of the music lesson. In this and certain other embodiments, the teacher can, for example, overlay a scale of the key of the audio content to visually illustrate how the key of a piece of music dictates the notes that should be played and the notes that should be avoided. Similarly, the teacher can for example, visually indicate when a piece of music changes key. Other types of edits a teacher can make to the digital display data include visually representing a note as a circle with a number in it or as the note's name, for example, A, A#, C, C#; adding visual representations of additional notes to indicate an arpeggio; and selecting and/or deleting portions of the digital display data. Thus, when a music lesson is conducted in real time, the teacher can revise the visual representation of the audio content in response to student questions or comments or as the teacher desires.

Still referring to FIG. 3, in this and certain other embodiments, the tabedit module 70 creates or revises a notation sub-file that includes digital display data but does not include digital audio data. The digital display data can be generated from a MIDI device 32 or generated by revising another notation sub-file included in a previous lesson or generated by the syncedit module 68. Unlike the visual display of the digital display data generated by the syncedit module 68 that is one line in length, the visual display of the digital display data generated by the tabedit module 70 can be wrapped from one line to another. Thus, the teacher can see a dynamic visual display of audio content that would ordinarily be too long to display on one line.

Still referring to FIG. 3, in this and certain other embodiments, a chat module 72 allows the teacher to receive and send textual messages to the students. As discussed elsewhere herein, this allows the student and teacher to provide and receive spontaneous or unscripted comments, questions or ideas that facilitate learning.

Still referring to FIG. 3, in this and certain other embodiments, the video and audio modules 74 and 76 generate respectively video and audio sub-files that can be included in the lesson file. The video module 74 can be used by the teacher to illustrate how audio content of the music lesson is played on a musical instrument. For example, if the music lesson involves a guitar, then the teacher can illustrate how the guitar is picked and fingered to produce the music. The audio module 76 can be used by the teacher to generate and revise looping audio content or non-looping audio content. For example, a rhythm guitar portion of the audio content can be repeated automatically while a student practices the lead guitar portion of the audio content. In addition, audio content that is too long or not wholly used to generate a dynamic visual display can be provided in the music lesson.

Still referring to FIG. 3, in this and certain other embodiments, the operation module 66 generates a text sub-file, in HTML format, of the teacher's instructions and comments during a lesson and includes a URL link to one or more of the other sub-files generated by the other modules. Furthermore, the operation module 66 embeds the URL links to the other sub-files in chronological order with the teacher's instructions and comments so that the student can chronologically work through the lesson by proceeding from the beginning of the text sub-file to the end of the text sub-file. For example, the teacher may desire to begin the lesson with a brief greeting followed by a performance of a piece of music from which a portion will be discussed in more detail. To do this the teacher would enter text with the alpha-numeric keyboard 80 of the teacher computer or by speaking into a microphone connected to a voice/text conversion program loaded on a computer at the teacher station. Next, the teacher may play the piece of music and create an audio sub-file of the music with the audio module. When the student displays the text sub-file, the student sees the greeting followed by a URL link to the audio sub-file.

Still referring to FIG. 3, in this and certain other embodiments, the operation module 66 also automatically creates and sends an updated text sub-file when the teacher sends another sub-file to the destination directory. For example, if the teacher desires to send just a greeting to the students, the teacher creates a text sub-file containing the greeting and sends the sub-file to the destination directory. When the student displays the text sub-file, the student simply sees the greeting. Then, if the teacher desires to send audio content, the teacher creates the audio sub-file and sends it to the destination directory, and the operation module automatically creates a new text sub-file that includes the greeting and a URL link to the audio sub-file. Thus, when the student displays the text sub-file, the student sees the greeting with the URL link to the audio sub-file.

Figure 4:
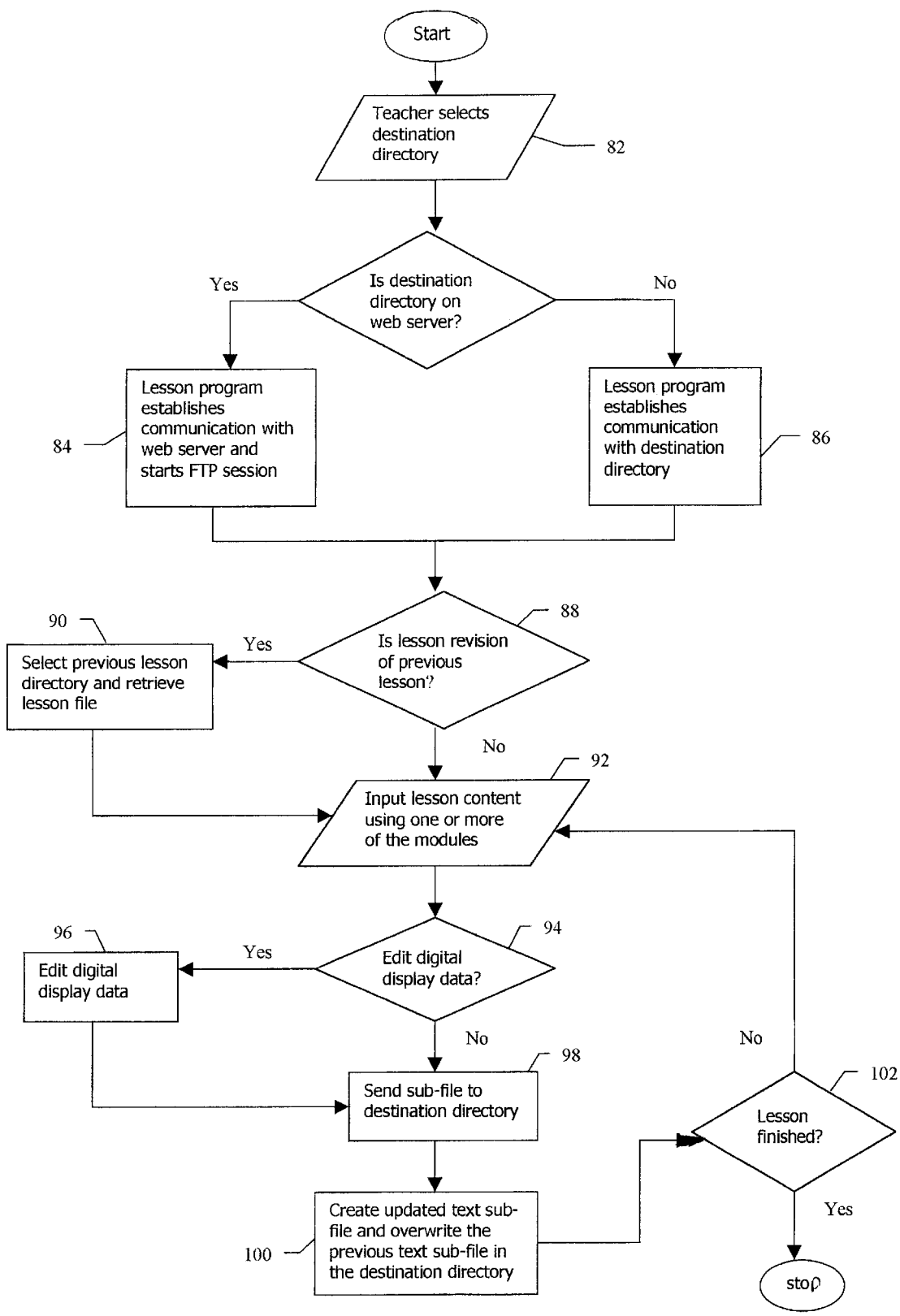
FIG. 4 shows a flowchart of a process for creating and revising a lesson file using the lesson creator/reviser program in FIG. 3, according to an embodiment of the invention.

FIG. 4 shows a flowchart of the process for creating or revising a lesson file using the lesson creator/reviser program according to an embodiment of the invention. When audio-notation, audio and video sub-files are sent to the destination directory, these subfiles do not overwrite a previous similar sub-file. When text sub-files, however, are sent to the destination directory, they do overwrite a previous text sub-file.

In this and certain other embodiments, at step 82, the teacher selects a destination directory. If the destination directory is located on the web server 46 in FIG. 1, then at step 84, the lesson program establishes communication with the web server 46 and starts a file transfer protocol (FTP) session. If the destination directory is not located on the web server 46, at step 86, the lesson program establishes communication with the selected destination directory on a storage device. At step 88, the teacher determines whether the new lesson file will be a revision of a previous lesson file or not. If the lesson file is to be a revision of a previous lesson file, then, at step 90, the teacher selects the directory containing the previous lesson file and retrieves the desired previous lesson's sub-files. If the lesson file will not be a revision of a previous lesson file, then, at step 92, the teacher inputs lesson content using one or more of the lesson creator/reviser program modules as discussed elsewhere herein. Next, at step 94, the teacher determines whether he/she wants to edit or revise the digital display data generated by the tabedit module 70 in FIG. 3 or the syncedit module 68 in FIG. 3. If the teacher does, then, at step 96 he/she edits the digital display data as discussed elsewhere herein. Then at step 98, the teacher sends the sub-file to the destination directory. At step 100, the operation module 66 in FIG. 3 creates a new text sub-file that includes a URL link to the sub-file just sent and overwrites the previous text sub-file in the destination directory. Next, at step 102 the teacher decides if the lesson is finished or not. If the lesson is finished, then the teacher closes the lesson file, if, however, the lesson is not finished then the teacher returns to step 92 to input more lesson content.

Figure 5:
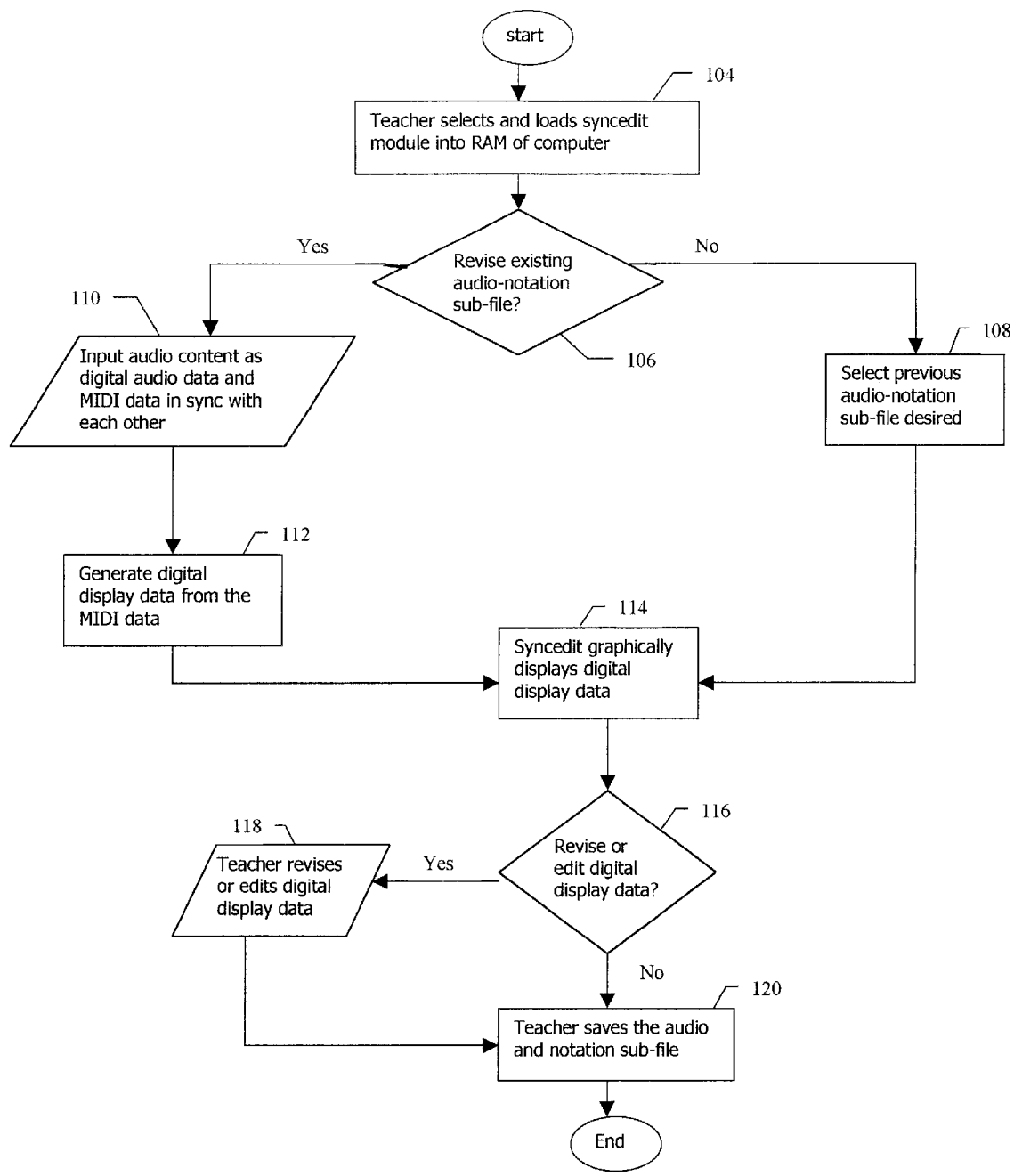
FIG. 5 shows a flowchart of a process for generating a portion of a lesson file using a syncedit module according to an embodiment of the invention.

FIG. 5 shows a flowchart of the process for generating an audio-notation sub-file with the syncedit module 68 in FIG. 3 according to an embodiment of the invention. In this and certain other embodiments, at step 104, the teacher selects and executes the syncedit module 68 in the teacher computer 30 in FIG. 1. Next, at step 106 the teacher determines whether he/she wants to revise a previous audio-notation sub-file or not. If the teacher does, then, at step 108, the teacher selects the desired audio-notation sub-file. If the teacher wants to generate a new audio-notation sub-file, then, at step 110, the teacher inputs audio content from a musical instrument 78 in FIG. 3 he/she plays or from a recording of a previous performance of the audio content. Such recordings can be on any desired medium such as magnetic tape, magnetic disk, CD, or located on another computer and downloaded to the teacher's computer 30. As discussed herein, the syncedit module 68 receives the audio content as digital audio data and MIDI data in sync with each other. At step 112 the syncedit module 68 generates digital display data from the MIDI data that is in sync with the digital audio data. Next at step 114, the syncedit module 68 displays the digital display data. Then, at step 116, the teacher determines whether he/she wants to revise the digital display data. If the teacher does, then, at step 118, the teacher revises the digital data using the syncedit module 68 as discussed elsewhere herein. Then at step 120, the teacher saves the audio-notation sub-file.

Figure 6:
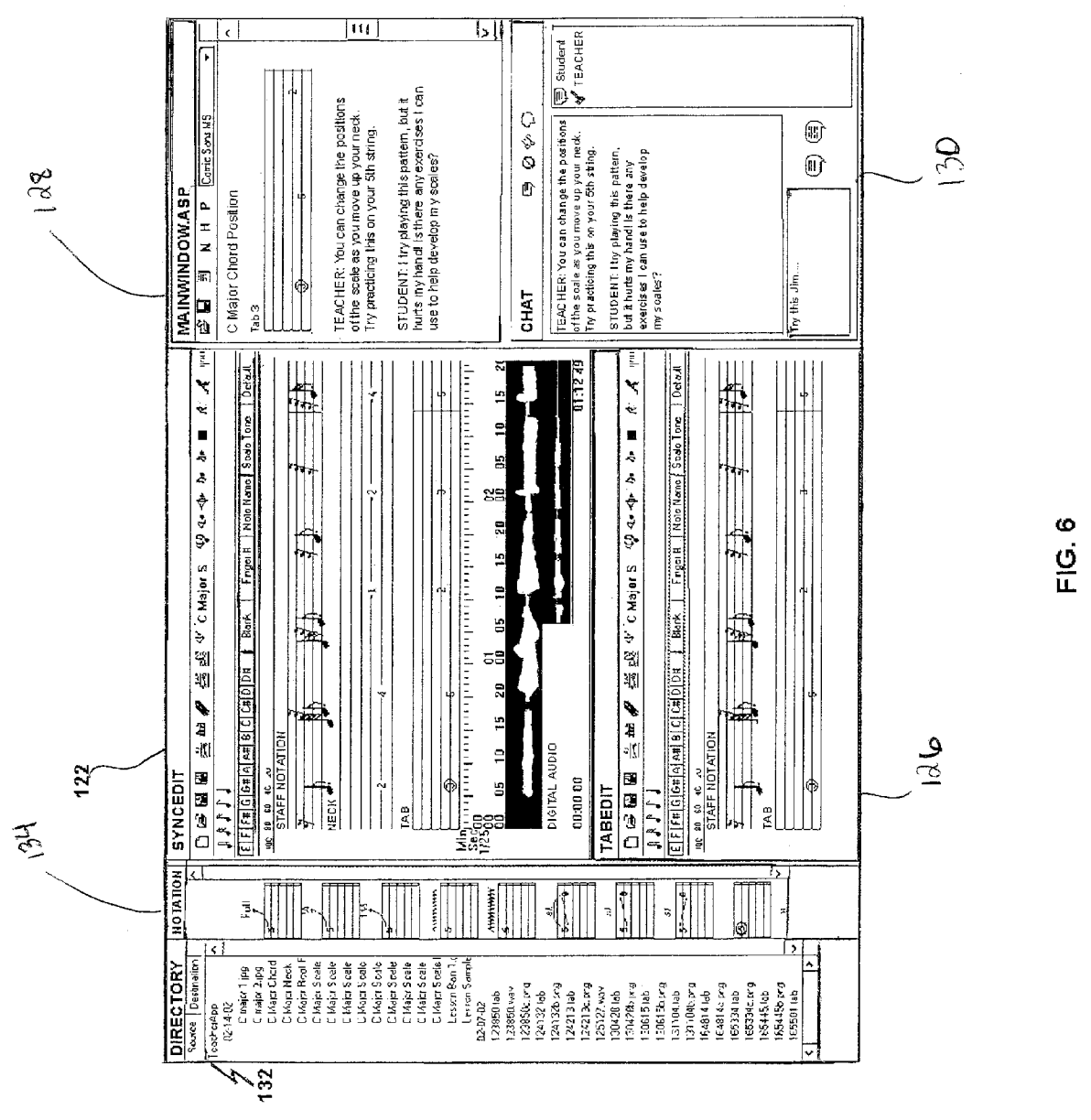

FIG. 6 is a representative screen display 122 of a lesson creator/reviser program displaying a digital lesson file to a teacher during the creation or revision of a digital lesson file according to an embodiment of the invention. In this and certain other embodiments the display 122 includes a syncedit window 124 that displays the data in the audio-notation sub-file and a tabedit window 126 that displays the digital display data in tabulature notation. The screen display 122 also includes a main window 128 that displays the text sub-file generated by the operation module 66 in FIG. 3. Also, included in the screen display 122 is a chat window 130 displaying the contents of the chat sub-file, a directory window 132 displaying the directory the lesson file is contained in and the various sub-files included in the lesson file, and a tabulature notation window 134 displaying various notation marks for the teacher to drag and drop onto the syncedit or tabedit windows 124 or 126 respectively, to revise the digital display data contained in the audio-notation sub-file.

Figure 7:
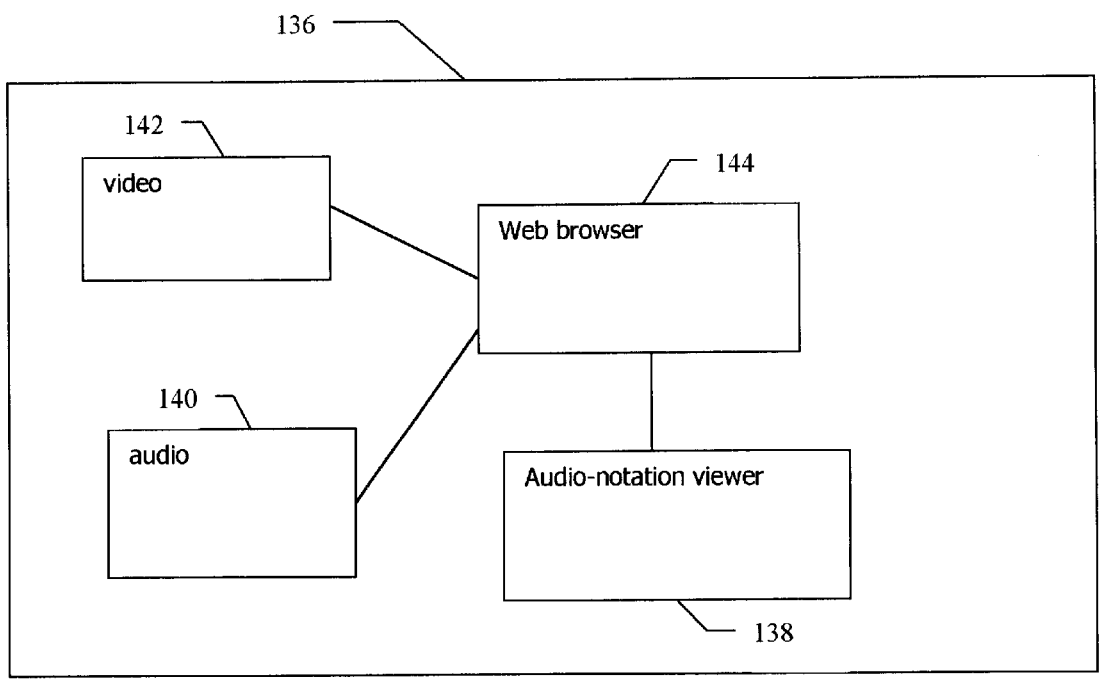
FIG. 7 shows a functional block diagram of a lesson viewer program illustrating a relationship of various modules included in the lesson viewer program, according to an embodiment of the invention.

FIG. 7 shows a functional block diagram illustrating a relationship of various modules that can be included in the lesson viewer program according to an embodiment of the invention. These modules read, display and play corresponding sub-files generated by the lesson creator/reviser program so that the student can see and/or hear content in the music lesson. In this and certain other embodiments, the lesson viewer program 136 includes and audio-notation viewer module 138 that can read and can display the digital display data of the audio-notation sub-file and can play in sync with the digital display data either the MIDI data, used to create the digital display data or the digital audio data. The lesson viewer program 136 also includes a conventional audio and video module 140 and 142, respectively, that can read, display and play respective digital audio data and digital video data. Furthermore, the lesson viewer program 136 includes an internet web browser module 144, such as Microsoft Explorer, that reads and displays the lesson file and controls the other audio-notation, audio and video modules.

In this and certain other embodiments, in addition to displaying and playing the audio-notation sub-file to the student, the audio-notation viewer module 138 also provides the student some control over how the audio-notation sub-file is displayed. Although the teacher dictates the form the digital display data is displayed to the student—staff or tabulature notation—, the student can control whether the audio content of the audio-notation sub-file is played with the display of the digital display data and whether MIDI data or digital audio data is used to play the audio content. Furthermore, the student can loop the digital display data and audio content in sync with each other as desired to repeat the musical concept taught in the lesson. Also, the student can increase or decrease the playing tempo of the audio-notation sub-file without losing the synchronicity of the digital display data and digital audio data and without changing the pitch of the audio content. This allows, for instance, a student to easily practice complex fingering of a guitar while still being able to hear the correct pitch of the notes. In addition, the student can view the digital display data as an image of a virtual musical instrument with dynamic representations on the instrument showing the note heard and displayed in staff or tabulature notation.

When the lesson viewer program 136 is running on the student computer 40 in FIG. 1 at the student station 24 in FIG. 1 and a lesson file is loaded into the lesson viewer program, the web browser 144 displays two sections. The first section contains the HTML formatted text sub-file with URL links to sub-files of the lesson file shown in chronological order as discussed elsewhere herein. The second section contains a display of an audio-notation sub-file, a display of a video sub-file and two displays of an audio sub-file for looping an audio sub-file the other for not looping an audio sub-file. When the student sees a link to lesson content that he/she wants to see or hear, the student selects the link and the lesson content is loaded into the web browser 144 and displayed in the second frame. The student can either view or listen to the selected lesson content until he/she selects another link in the lesson file displayed in the first frame. Meanwhile, if the student is currently participating in a lesson provided in real time, the lesson file in the first frame continues to display the most current text sub-file. In this manner, many students can participate in a lesson provided in real time at their own pace without affecting the other students pace.

Figure 8:
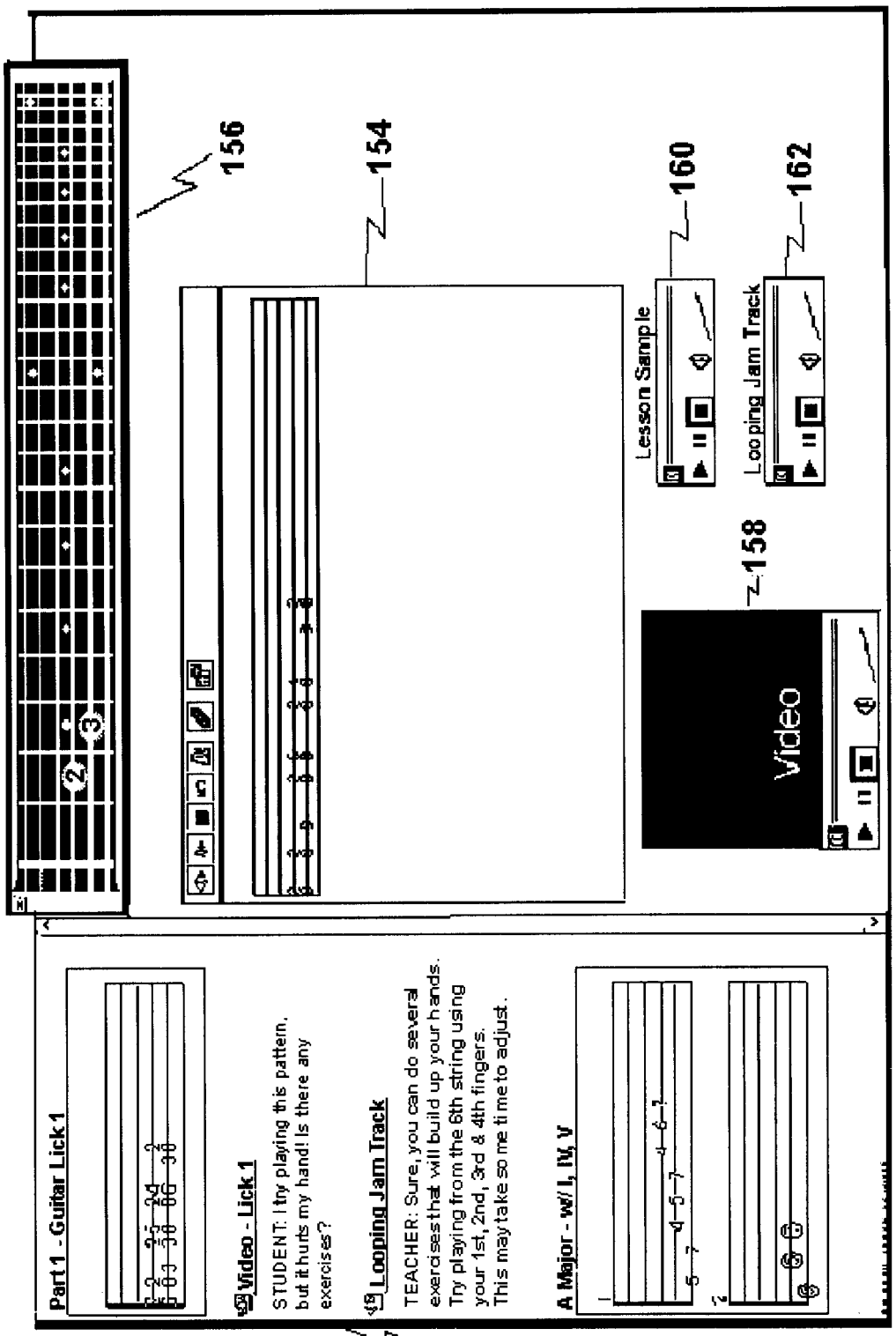
FIG. 8 shows a representative screen display of the lesson viewer program in FIG. 7 displaying a lesson file according to an embodiment of the invention.

FIG. 8 shows a representative screen display 150 of the lesson viewer displaying a digital lesson file to a student according to an embodiment of the invention. In this and certain other embodiments, the display includes a text window 152 displaying the text sub-file and URL links to the various other sub-files. The screen display 150 also includes a notation window 154 that displays digital display data in tabulature notation and a virtual instrument window 156 that displays digital display data as notes played on an instrument. In addition, the screen display 150 includes a video window 158 that can display a video sub-file and controls a student can use to play, pause or stop the video sub-file, and two audio windows 160 and 162 that can display controls a student can use to play, pause or stop an audio sub-file.

Although a system and method for creating, revising and providing a music lesson over a communications network has been described in considerable detail with reference to certain embodiments for purposes of illustration, other embodiments are possible. Therefore the spirit and scope of the appended claims should not be limited to the above description of the embodiments; the present invention includes suitable modifications as well as all permutations and combinations of the subject matter set forth herein.

What is claimed is:

1. A method for creating, revising or creating and revising a music lesson comprising:
   simultaneously recording digital audio data representing a note or series of notes and MIDI data representing the same note or series of notes;
   generating dynamic visual display data from the MIDI data wherein the dynamic visual display data can be dynamically displayed in sync with the digital audio data as the digital audio data is played;
   revising the dynamic visual display data; and
   performing at least one of the group consisting of:
      generating, revising, or generating and revising a notation sub-file with a tabedit module,
      generating a text sub-file with an operation module and linking the digital audio data, the MIDI data and the dynamic digital display data with a URL included in the text sub-file,
      generating an audio sub-file with an audio module, and
      generating a video sub-file with a video module.

2. A method for conducting a music lesson over a communication network, comprising:
   generating an audio-notation sub-file with a syncedit module;
   storing the audio-notation sub-file in a destination directory;
   generating a text sub-file with an operation module wherein the text file includes a URL link to the audio-notation sub-file;
   storing the text sub-file in the same destination directory;
   retrieving the text and audio-notation sub-files from the destination directory; and
   displaying the text and audio-notation sub-files on a student computer.

3. The method of claim 2 wherein retrieving the audio-notation sub-file includes selecting a URL link included in the text sub-file that corresponds to the audio-notation sub-file.

4. The method of claim 2 further comprising locating the destination directory on a web server at an administrative station, and wherein storing and retrieving the audio-notation and text sub-files include establishing communication with the web server.

5. The method of claim 4 wherein storing and retrieving the audio-notation and text sub-files occur in real time or substantially real time.

6. The method of claim 5 wherein, when a text sub-file is updated, retrieving the text sub-file includes the web server requesting the student computer to retrieve the updated text sub-file.

7. A system for providing a music lesson over a communication network operatively connecting a teacher station and student station together, comprising:
   teacher station comprising a lesson creator/reviser program executable by a teacher computer, operable to generate a digital lesson file, and including the following modules, each operable to generate a sub-file to form the digital lesson file:
      a syncedit module operable to simultaneously receive digital audio data and MIDI data representing one or more musical notes and to generate dynamic visual display data of the one or more musical notes;
      an operation module operable to generate a text sub-file of instructions and comments during a lesson; and
      a tabedit module operable to create, revise or create and revise a notation sub-file; and
   a student station comprising a lesson viewer program executable by a student computer and operable to display the digital lesson file.

8. The system of claim 7 wherein the text sub-file includes an HTML format and a URL link to one or more other sub-files.

9. The system of claim 7 wherein the notation sub-file can be displayed as one or more lines of musical notation wherein when more than one line is displayed the musical notation is wrapped from one line to another.

* * * * *